United States Patent [19]
Kikuchi

[11] 4,204,441
[45] May 27, 1980

[54] WORKPIECE LOADING APPARATUS

[75] Inventor: Makoto Kikuchi, Kariya, Japan

[73] Assignee: Toyoda Koki Kabushiki Kaisha, Kariya, Japan

[21] Appl. No.: 947,045

[22] Filed: Sep. 29, 1978

[30] Foreign Application Priority Data

Oct. 8, 1977 [JP] Japan ................ 52-121069

[51] Int. Cl.² ........................................... B23B 13/00
[52] U.S. Cl. ....................................................... 82/2.5
[58] Field of Search ................................. 82/2.5, 2.7

[56] References Cited

U.S. PATENT DOCUMENTS

| | | | |
|---|---|---|---|
| 2,542,318 | 2/1951 | Faverty et al. | 82/2.5 |
| 3,550,503 | 12/1970 | Pallay | 82/2.5X |
| 3,803,955 | 4/1974 | Walk | 82/2.5 |
| 3,926,078 | 12/1975 | Ishizuka et al. | 82/2.5 X |
| 4,008,634 | 2/1977 | Flisch | 82/2.5 |
| 4,065,988 | 1/1978 | Lohneis et al. | 82/2.5 X |

FOREIGN PATENT DOCUMENTS 42671  7/1965  German Democratic Rep. ........ 82/2.5

*Primary Examiner*—Harrison L. Hinson
*Attorney, Agent, or Firm*—Oblon, Fisher, Spvak, McClelland & Maier

[57] ABSTRACT

An apparatus for loading a disk-like workpiece into a chuck mounted on a spindle head and rotated about a horizontal axis. A swing arm is supported by a housing to be rotatable about an axis which is substantially parallel to the rotational axis of the chuck. Drive means swings the swing arm between a workpiece pick-up position and a workpiece delivery position. Workpiece support means is supported on the swing arm to be rotatable about an axis which is perpendicular to the axis of swinging movement of the swing arm for supporting a disk-like workpiece thereon, and is held within a substantially horizontal plane when the swing arm is at its pick-up position. Rotary means is operated by the drive means for rotating the workpiece support means a predetermined angle during a part of the swinging movement of the swing arm so as to align the workpiece held on the support means with the chuck when the swing arm is swung into its delivery position.

6 Claims, 8 Drawing Figures

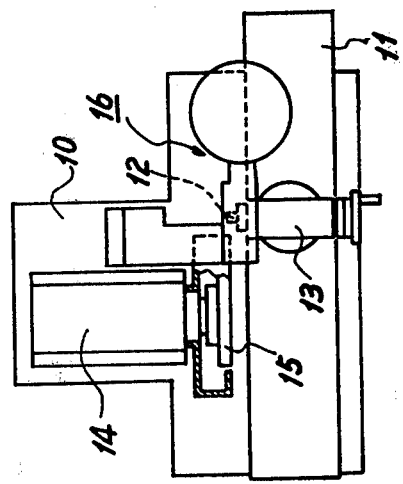
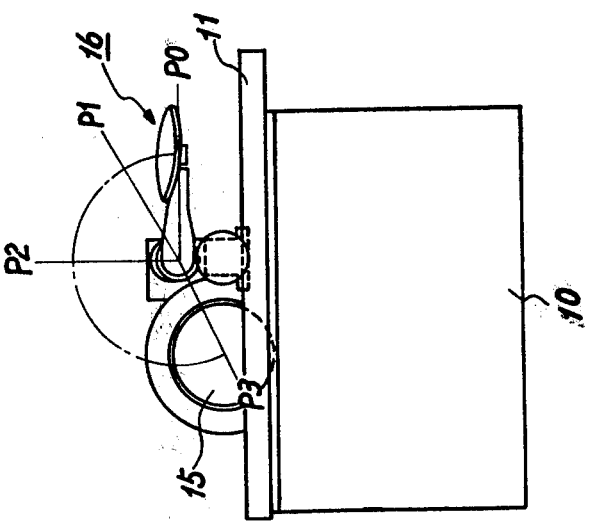

WORKPIECE LOADING APPARATUS

BACKGROUND OF THE INVENTION

1. Field of the Invention

The present invention relates to an apparatus for loading a disk-like workpiece into a chuck mounted on a spindle head.

2. Description of the Prior Art

In order to perform a machining operation on a disk-like workpiece by a lathe, the workpiece had been manually loaded on a chuck mounted on a spindle head. However, an operator had a difficulty in handling a disk-like workpiece being thin in width within a space limited by a tool support without interfering the workpiece with any portion of the machine.

SUMMARY OF THE INVENTION

It is therefore an object of the present invention to provide a new and improved apparatus capable of loading a disk-like workpiece into a chuck mounted on a spindle head and rotated about a horizontal axis only by putting the workpiece on a workpiece support member being held within a substantially horizontal plane.

Another object of the present invention is to provide a new and improved workpiece loading apparatus wherein a disk-like workpiece is changed in posture during a part of swinging movement thereof.

A further object of the present invention is to provide a new and improved workpiece loading apparatus wherein the axis of a swing arm for swinging a workpiece is inclined from the horizontal axis, whereby the workpiece is displaced axially of and toward the chuck, as the swing arm is swung.

Briefly, according to the present invention, these and other objects are achieved by providing an apparatus for loading a disk-like workpiece into a chuck mounted on a spindle head and rotated about a horizontal axis, as mentioned below. A swing arm is supported by a housing to be rotatable about an axis which is substantially parallel to the rotational axis of the chuck. Drive means swings the swing arm between a workpiece pick-up position and a workpiece delivery position. Workpiece support means is supported on the swing arm to be rotatable about an axis which is perpendicular to the axis of swinging movement of the swing arm for supporting a disk-like workpiece thereon, and is held within a substantially horizontal plane when the swing arm is at its pick-up position. Rotary means is operated by the drive means for rotating the workpiece support means a predetermined angle during a part of the swinging movement of the swing arm so as to align the workpiece held on the support means with the chuck when the swing arm is swung into its delivery position.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 1 is a front elevational view of a lathe provided with a workpiece loading apparatus according to the present invention;

FIG. 2 is a plan view of the apparatus shown in FIG. 1;

DETAILED DESCRIPTION OF THE PREFERRED EMBODIMENT

Figure 3:
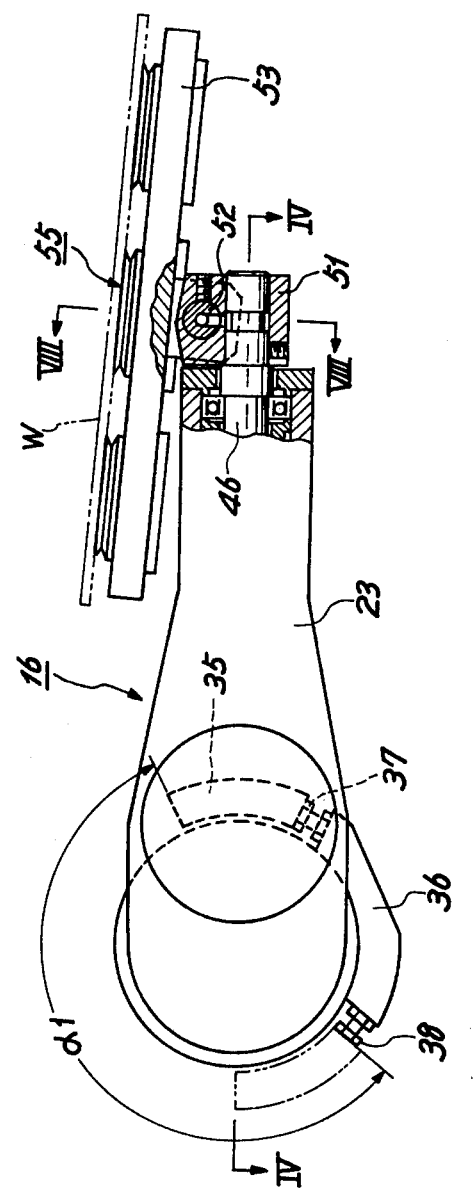
FIG. 3 is a fragmentary enlarged view, partly in section, of the loading apparatus shown in FIG. 1.

Referring now to the drawings, wherein like reference numerals or characters refer to identical or corresponding parts throughout the several views, and more particularly to FIGS. 1 and 2, there is shown a lathe provided with a workpiece loading apparatus according to the present invention. The lathe comprises a bed 10 on which a table 11 is mounted to be slidable in a longitudinal direction. A tool support 13 carrying a cutting tool 12 is mounted on the table 11. A spindle head 14 is also mounted on the bed 10 and supports a vacuum chuck 15 to be rotatable about a horizontal axis perpendicular to the sliding direction of the table 11. A workpiece loading apparatus, generally indicated at 16, is mounted on the bed 10 adjacent to the spindle head 14 for loading an unfinished disk-like workpiece W into the front of the vacuum chuck 15 and for unloading a finished workpiece W from the vacuum chuck 15.

The detail of the workpiece loading apparatus 16 will be hereinafter described. Referring to FIGS. 3 to 6, a frame 20 is mounted on the bed 10 and has secured thereto a housing 21 constituting a body of the workpiece loading apparatus 16. A hollow sleeve shaft 22 is received in the housing 21 to be rotatable about an axis L inclined downwardly toward the front end, as viewed in FIG. 5 by an angle relative to a horizontal axis parallel to the rotational axis of the vacuum chuck 15. A base portion of a swing arm 23 is secured to the front end of the sleeve shaft 22. A rotary shaft 24 is rotatably received within the sleeve shaft 22. Gears 25 and 26 are secured on the rear ends of the rotary shaft 24 and the sleeve shaft 22, respectively.

Figure 4:
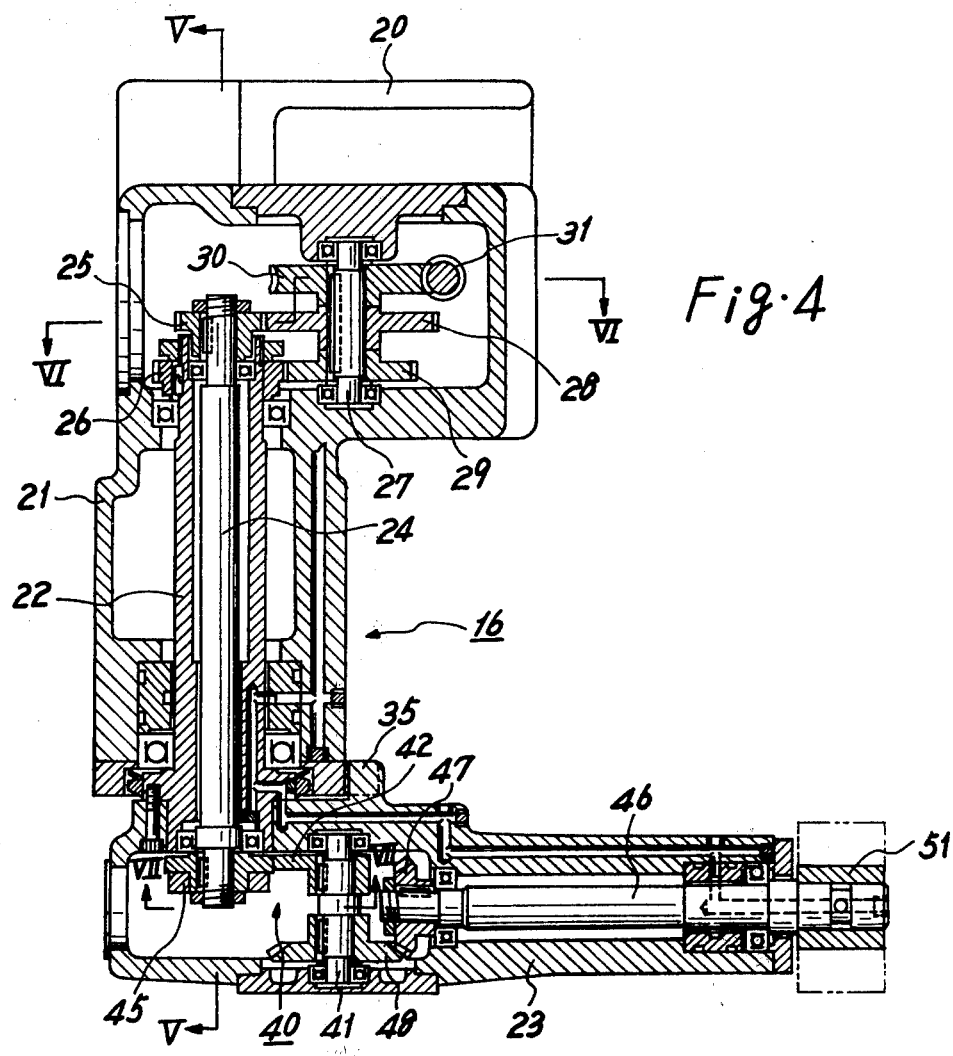
FIG. 4 is a sectional view taken along the lines IV—IV in FIG. 3.
Figure 5:
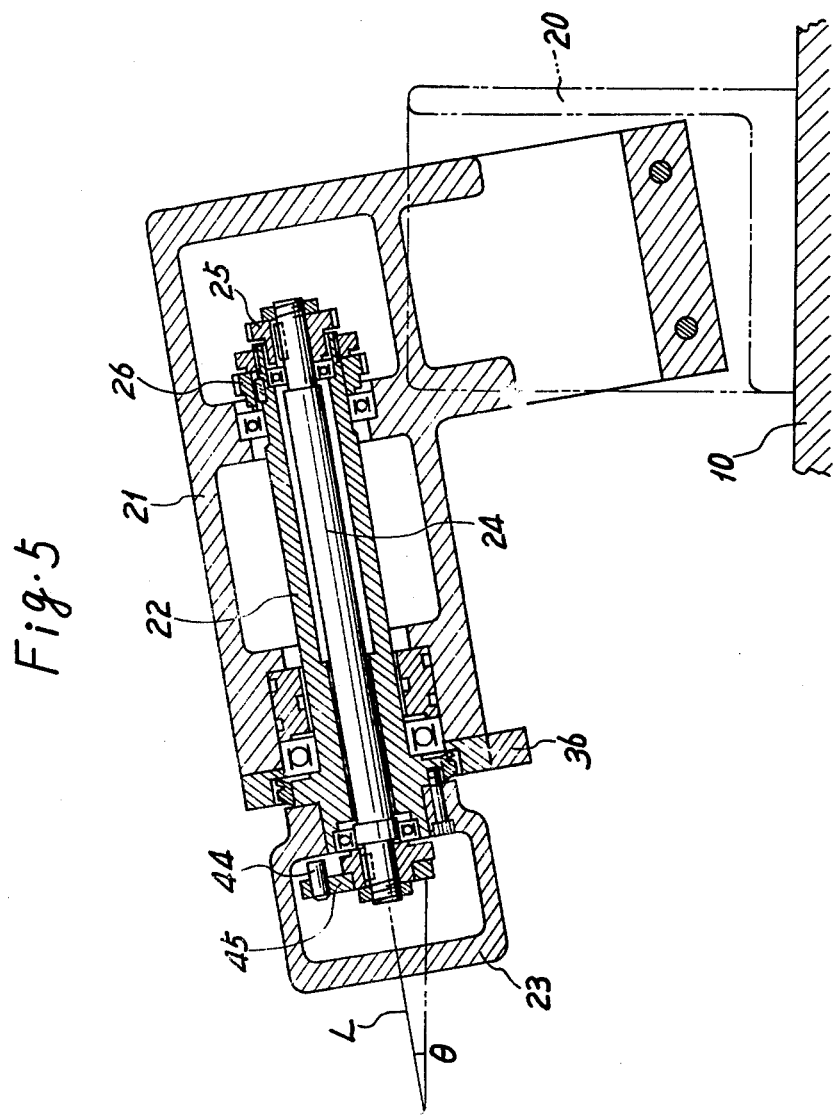
FIGS. 5 and 6 are sectional views taken along the lines V—V and VI—VI, respectively, in FIG. 4.
Figure 6:
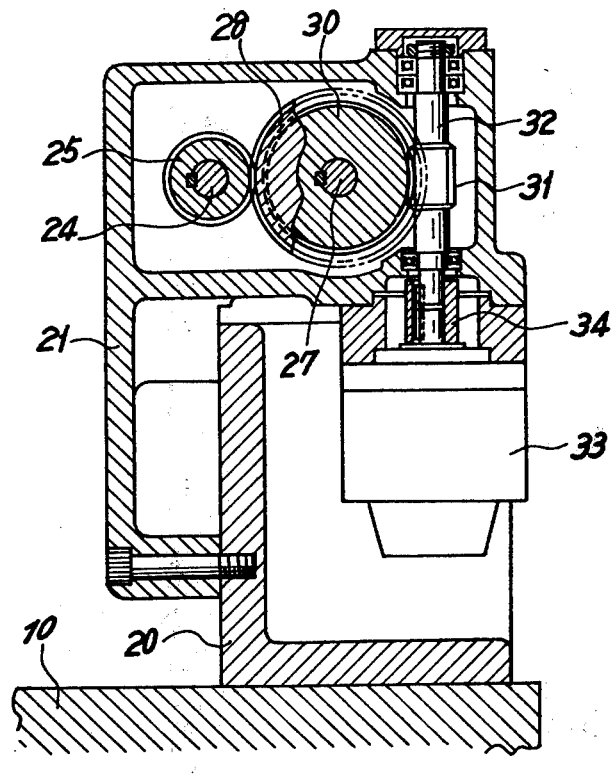

As shown in FIG. 4, a gear shaft 27 is rotatably received within the housing 21 in parallel relationship with the sleeve shaft 22 and has secured thereto gears 28 and 29 which are in meshing engagement with the gears 25 and 26, respectively. The gear shaft 27 has also secured thereto a worm wheel 30 which is in meshing engagement with a worm 31 formed on a worm shaft 32 shown in FIG. 6. The worm shaft 32 is rotatably journalled within the housing 21 and connected at its one end through a coupling 34 with an output shaft of a hydraulic motor 33 secured to the housing 21.

When the hydraulic motor 33 is actuated, the sleeve shaft 22 and the rotary shaft 24 are rotated about the axis L in the same direction through the above-mentioned gearings. Accordingly, the swing arm 23 is rotated about the axis L together with the sleeve shaft 22. The swinging movement of the swing arm 23 is restricted by stop bolts 37 and 38 screwed into a bracket 36 secured to the housing 21, with which bolts 37 and 38 a block 35 projected from the base portion of the swing arm 23 is engageable. The swing arm 23 is therefore swung between a workpiece pick-up position P0 and a workpiece delivery position P3 adjacent the vacuum chuck 15, as shown in FIG. 1.

The gear ratio of the gear 28 to the gear 25 is determined to be larger than that of the gear 29 to the gear 26, so that the relative rotation is caused between the sleeve shaft 22 and the rotary shaft 24. More specifically, when the sleeve shaft 22 and the swing arm 23 are rotated a predetermined angle 1 from the pick-up position P0, where the block 35 is in abutting engagement with the stop bolt 37, to the delivery position P3, where the block 35 is in abutting engagement with the other stop bolt 38, the rotary shaft 24 is rotated in the same direction a predetermined angle 2, not shown, larger than the angle 1. Accordingly, the relative rotation of angle 3 (=2−1) is caused between the sleeve shaft 22 and the rotary shaft 24 to actuate a Geneva mechanism 40, which is described later.

Figure 7:
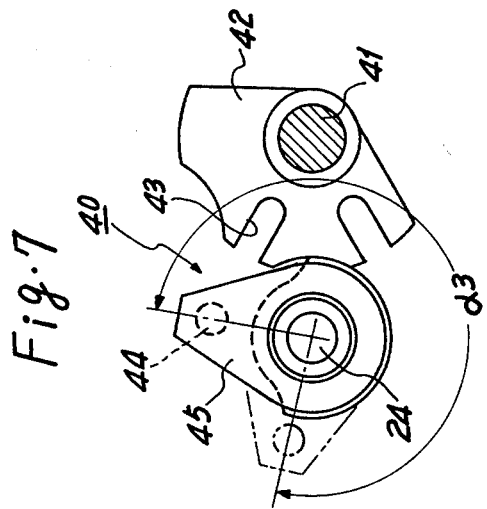
FIG. 7 is an enlarged sectional view taken along the lines VII—VII in FIG. 4.

A support shaft 41 is rotatably received within the swing arm 23 in parallel relationship with the sleeve shaft 22 and fixedly supports a Geneva plate 42 of the Geneva mechanism 40. The Geneva plate 42 is formed with two radial slots 43, as shown in FIG. 7. The rotary shaft 24 has secured at its one end within the swing arm 23 a Geneva crank 45 which is provided with an engaging pin 44 engageable with either of the radial slots 43 of the Geneva plate 42. The Geneva crank 45 is rotated relative to the Geneva plate 42 by the relative rotation between the sleeve shaft 22 and the rotary shaft 24 in such a manner as to rotate the Geneva plate 42 and the support shaft 41 a predetermined angle, while the swing arm 23 is rotated the predetermined angle 1.

A rotary shaft 46 is rotatably received within the swing arm 23 in perpendicular relationship with the support shaft 41 and has secured at its one end a bevel gear 47 in meshing engagement with a bevel gear 48 secured to the support shaft 41. The gear ratio of the bevel gear 47 to the bevel gear 48 is determined in such a manner that the rotary shaft 46 is rotated 90 degrees, when the support shaft 41 is rotated the predetermined angle.

Figure 8:
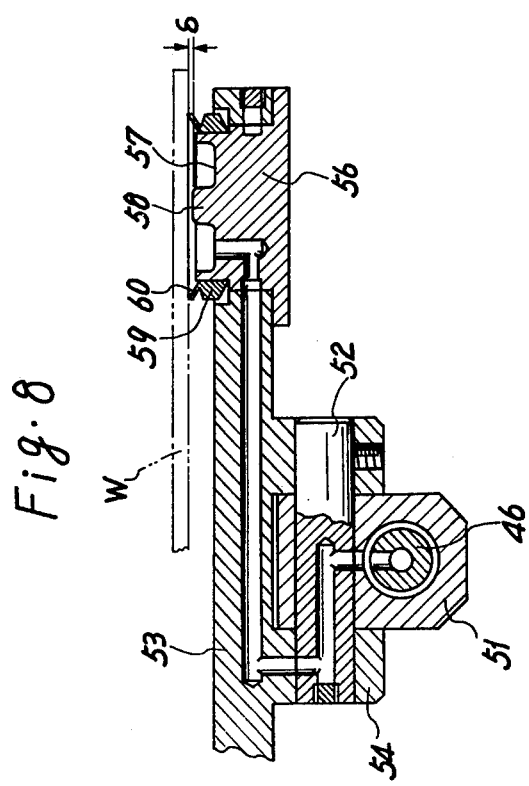
FIG. 8 is an enlarged sectional view taken along the lines VIII—VIII in FIG. 7.

A support block 51 is secured to the front end of the rotary shaft 46 out side the swing arm 23. A support shaft 52 is fitted into the support block 51 in perpendicular relationship with the rotary shaft 46. A bottom portion 54 of a disk-like workpiece support plate 53 is fixedly mounted on the support shaft 52. The workpiece support plate 53 is angularly adjusted about the axes of the rotary shaft 46 and the support shaft 52 in such a manner as to be moved into a parallel relationship with a workpiece mounting surface of the vacuum chuck 15 when the swing arm is swung into the delivery position P3 where the block 35 is in abutting engagement with the stop bolt 38, and the rotary shaft 46 is rotated 90 degrees. A plurality of attraction devices 55 are equispacedly arranged on the perphery of the workpiece support plate 53 in order to attractively hold the workpiece W. Each of the attraction devices 55 is provided with an attraction head 56 secured to the periphery of the support plate 53, as shown in FIG. 8. The attraction head 56 has at its one side an annular groove 57 connected through an air passage to a vacuum pump, not shown. A reference projection 58 is extended from the center of the annular groove 57 to be engaged with the workpiece W. A V-ring 59 is fitted on the periphery of the attraction head 56 to surround the annular groove 57. A lip portion 60 of the V-ring 59 is projected an amount from the upper surface of the reference projection 58 under the free or incompressed state.

The operation of the loading apparatus according to the present invention will now be described. It is assumed that all of the drawings show component parts at their original positions. Accordingly, the swing arm 23 is at its pick-up position P0 where the block 35 is in abutting engagement with the stop bolt 37 and the workpiece support plate 53 is held within a substantially horizontal plane.

At first, an unfinished disk-like workpiece W is mounted on the support plate 53 to be elastically held by the lip portions 60 of the V-rings 59. Under these states, when an operating lever, not shown, is manipulated, the vacuum pump, not shown, is actuated to vacumize the annular grooves 57 of the attraction devices 55. Accordingly, the workpiece W is sucked into contact with the reference projections 58 against the elastic force of the lip portions 60 of the V-rings 59 to be attractively held on the support plate 53.

Subsequently, the hydraulic motor 33 is actuated to rotate the gear shaft 27 through the worm 31 and the worm wheel 30. Rotation of the gear shaft 27 causes counterclockwise rotation of the sleeve shaft 22 and the swing arm 23 through the gears 29 and 26, as viewed in FIG. 1. At the same time therewith, the rotary shaft 24 is also rotated through the gears 28 and 25 in the same direction as the sleeve shaft 22 at a faster speed than that of the sleeve shaft 22. The relative rotation between the sleeve shaft 22 and the rotary shaft 24 causes the Geneva crank 45 to rotate relative to the Geneva plate 42 journalled within the swing arm 23. Accordingly, the engaging pin 44 of the Geneva crank 45 is rotated clockwise, as viewed in FIG. 7, toward the radial slot 43 on the Geneva plate 42. When the swing arm 23 is swung into a position P1 shown in FIG. 1, the engaging pin 44 of the Geneva crank 45 is moved into engagement with the radial slot 43 on the Geneva plate 42 to rotate the Geneva plate 42 counterclockwise, as viewed in FIG. 7. Accordingly, the rotary shaft 46 and the workpiece support plate 53 are rotated clockwise, as viewed in FIG. 8 to gradually change the posture of the workpiece W. The Geneva plate 42 is rotated the predetermined angle by the time when the engaging pin 44 is disengaged from the radial slot 43, whereby the rotary shaft 46 is rotated 90 degrees. Accordingly, when the swing arm 23 is swung into its top position P2, as shown in FIG. 1, the workpiece W is held in substantially parallel relationship with the mounting surface of the vacuum chuck 15.

When the swing arm 23 is thereafter swung into the delivery position P3, the block 35 is in abutting engagement with the stop bolt 38 to restrict the swinging movement of the swing arm 23. Under these states, the workpiece W, which is attractively held on the support plate 53, is aligned with the axis of the vacuum chuck 15 on the spindle head 14 and is held extremely adjacent to and in parallel relationship with the mounting surface of the vacuum chuck 15. More specifically, since the swing arm 23 is rotated about the axis L inclined downwardly toward the front, the end portion of the swing arm 23 is displaced axially of the vacuum chuck 15 toward the mounting surface thereof, as the swing arm 23 is rotated downwardly toward the vacuum chuck 15 from its top position P2. Accordingly, when the swing arm 23 is swung into its delivery position P3 where the block 35 is in abutting engagement with the stop bolt 38, the workpiece W attractively held on the support plate 53 is held extremely adjacent to the mounting surface of the vacuum chuck 15.

When the swing arm 23 is rotated the predetermined angle 1 into its delivery position P3, the air passage communicating with the annular groove 57 is opened to the atmosphere, so that the workpiece W is urged toward the mounting surface of the vacuum chuck 15 by an elastic restitution force of the lip portions 60 of the V-rings 59 to be attractively held by the vacuum chuck 15.

The swing arm 23 is thereafter returned to its original pick-up position P0 where the block 35 is in abutting engagement with the stop bolt 37 by the reverse operation of the hydraulic motor 33. The rotary shaft 46 is also rotated 90 degrees in the reverse direction in cooperation with the swinging movement of the swing arm 23. Thereafter, a machining operation is initiated on the workpiece W held on the vacuum chuck 15.

In the embodiment described above, since the swinging axis L of the swing arm 23 is a little inclined from the horizontal axis, the workpiece W held on the support plate 53 is displaced axially of the vacuum chuck 15 toward the mounting surface thereof, as the swing arm 23 is swung. Accordingly, the workpiece W can be moved into a position extremely adjacent to the mounting surface of the vacuum chuck 15 and there is no need of a special shifting device for the delivery of the workpiece W to the vacuum chuck 15.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. An apparatus for loading a disk-like workpiece into a chuck mounted on a spindle head and rotated about a horizontal axis comprising:
    a housing;
    a swing arm supported by said housing to be rotatable about an axis which is substantially parallel to the rotational axis of said chuck;
    drive means for swinging said swing arm between a workpiece pick-up position and a workpiece delivery position;
    workpiece support means supported on said swing arm to be rotatable about an axis which is perpendicular to the axis of swinging movement of said swing arm for supporting a disk-like workpiece thereon, and being held within a substantially horizontal plane when said swing arm is at its pick-up position; and
    rotary means operated by said drive means for rotating said workpiece support means a predetermined angle during a part of the swinging movement of said swing arm so as to align the workpiece held on said support means with said chuck when said swing arm is swung into its delivery position.

2. An apparatus for loading a disk-like workpiece into a chuck mounted on a spindle and rotated about a horizontal axis comprising:
    a housing;
    a sleeve shaft supported by said housing to be rotatable about an axis which is substantially parallel to the rotational axis of said chuck;
    a rotary shaft rotatably received within said sleeve shaft;
    a swing arm secured to one end of said sleeve shaft;
    drive means for swinging said swing arm between a workpiece pick-up position and a workpiece delivery position and for causing relative rotation between said sleeve shaft and said rotary shaft;
    workpiece support means supported on said swing arm to be rotatable about an axis which is perpendicular to the axis of swinging movement of said swing arm for supporting a disk-like workpiece, and being held within a substantially horizontal plane when said swing arm is at its pick-up position; and
    rotary means operated in response to the relative rotation between said sleeve shaft and said rotary shaft for rotating said workpiece support means a predetermined angle during a part of the swinging movement of said swing arm so as to align the workpiece held on said support means with said chuck when said swing arm is swung into its delivery position.

3. An apparatus as set forth in claim 2, wherein said rotary means comprises:
    a Geneva crank secured to one end of said rotary shaft within said swing arm;
    an engaging pin provided on said Geneva crank;
    a support shaft rotatably received within said swing arm in parallel relationship with said rotary shaft;
    a Geneva plate fixedly supported on said support shaft and provided with a pair of radial slots with either of which said engaging pin is engageable, when rotated by the relative rotation between said sleeve shaft and said rotary shaft;
    a first bevel gear mounted on said support shaft;
    another rotary shaft rotatably received within said swing arm in perpendicular relationship with said sleeve shaft for supporting said workpiece support means outside said swing arm; and
    a second bevel gear supported on said another rotary shaft in meshing engagement with said first bevel gear.

4. An apparatus as set forth in claim 3, wherein said drive means comprises:
    a first pair of gears mounted on said sleeve shaft and said rotary shaft, respectively;
    a gear shaft rotatably received within said housing in parallel relationship with said sleeve shaft;
    a second pair of gears mounted on said gear shaft in meshing engagement with said second pair of gears, gear ratios between said first pair of gears and said second pair of gears are determined to cause the relative rotation between said sleeve shaft and said rotary shaft; and
    means for rotating said gear shaft.

5. An apparatus as set forth in claim 1, 2, 3 or 4, wherein said swing arm is rotatable about an axis which is inclined relative to the horizontal plane so as to displace said workpiece support means axially of and toward said chuck, as said swing arm is swung.

6. An apparatus as set forth in claim 5, wherein said workpiece support means attractively supports the disk-like workpiece by an action of vacuum.

* * * * *